United States Patent [19]

Machell

[11] E Patent Number: Re. 31,826

[45] Reissued Date of Patent: Feb. 5, 1985

[54] HOT MELT ADHESIVE BONDED PILE FABRICS

[75] Inventor: Greville Machell, Spartanburg, S.C.

[73] Assignee: Milliken Research Corporation, Spartanburg, S.C.

[21] Appl. No.: 503,206

[22] Filed: Jun. 10, 1983

Related U.S. Patent Documents

Reissue of:

[64] Patent No.: 4,371,576
Issued: Feb. 1, 1983
Appl. No.: 304,486
Filed: Sep. 22, 1981

[51] Int. Cl.[3] ..... D04H 11/08

[52] U.S. Cl. ..... 428/92; 156/72; 428/93; 428/94; 428/95; 428/96; 428/97

[58] Field of Search ..... 428/85, 92, 93, 94, 428/95, 96, 97; 156/72

[56] References Cited

U.S. PATENT DOCUMENTS

| | | | |
|---|---|---|---|
| Re. 29,988 | 5/1979 | Hospied | 156/72 |
| 2,101,905 | 12/1937 | Hopkinson | 154/2 |
| 3,411,966 | 11/1968 | Couquet | 428/92 |
| 3,709,711 | 1/1973 | Boultinghouse | 156/72 |
| 3,790,426 | 2/1974 | Bylund | 156/72 |
| 3,905,857 | 9/1975 | Short | 428/92 |

*Primary Examiner*—Marion McCamish
*Attorney, Agent, or Firm*—H. William Petry; Terry T. Moyer

[57] ABSTRACT

A hot melt adhesive bonded pile fabric is provided which comprises a liquid permeable base layer; a pile forming yarn adjacent to the base layer in pile forming fashion but not tufted through the base layer; the pile forming element having been bonded to the base layer by means of a hot melt adhesive applied to the back of said base layer. A method and apparatus for making fusion bonded, pile fabrics are also provided.

5 Claims, 11 Drawing Figures

GMAØ
GMA1
GMA2
GMA3
ESYNC*
DSYNC*
PRIORITY EN-CODER
DOWN COUNTER
CK
LOAD
MCLK*
C LOAD*
INIT COMPLETE
INIT*
PRESET*
DCLR*
MUX
LATCH
PRESET
DISABLE
CLEAR
CLK
DCLR
MCKL
+5V
MCKL*
START* CYCLE
INPORT PORT
CM15*
CMD13*
202
204
500
502
504
506
508
510
512
514
516
518
520
522
524
526
528
530
532
534
536
538
540
542
544

START TEST CYCLE GENERATOR
714
START CYCLE*
814
DCLR*
DCLR
802
+5V
+5V
+5V
800
STOP CYCLE
MCKL
CMD1*
RESET*
LISTEN*
712
826
820
822
824
LISTEN ENABLE GENERATOR
806
808
810
812
DSYNC
816
804
INIT COMPLETE
MD 4*
MD 5*
MD 6*
MD 7*
MA Φ
MA 1
MA 2
MA 3
DTMW*
DCLR*

CRC RESULT
COUNT AND HIGH RESULT
COUNT AND HIGH RESET
CRC GENERATOR
START CYCLE*
CLR*
RDATA
+15V
THRESHOLD
RESPONSE LINE INTERFACE
A/D CONVERT
ANALOG TO DIGITAL CONVERTER
TO INPUT PORT
DE-CODER
LISTEN*
DCLR
CMD 8*
MCKL*
UP
CLEAR
COUNT*
HIGH*
MCKL
RDATA
128
900
902
904
905
906
908
910
914
916
918
920
922
924
926
928
930
932
934
936
938
940
942
720
722
724

HOT MELT ADHESIVE BONDED PILE FABRICS

Matter enclosed in heavy brackets [ ] appears in the original patent but forms no part of this reissue specification; matter printed in italics indicates the additions made by reissue.

The present invention relates to pile fabrics. More particularly the present invention relates to a method of manufacturing hot melt adhesive bonded pile fabrics, apparatus which may be used for carrying out the method and the hot melt adhesive bonded pile fabric itself.

Pile fabrics such as carpeting may be manufactured in several ways such as by weaving, tufting, needling or bonding. In each method the pile must be secured to a base or support layer in one way or another. The present invention is particularly concerned in one aspect with a method of manufacture wherein the pile is bonded by means of a hot melt adhesive to a base layer. Such fabrics will herein be referred to variously as hot melt adhesive bonded pile fabrics, or hot melt adhesive bonded carpets.

A number of techniques are known for the manufacture of bonded pile fabrics which involve the coating of a preformed base layer with a layer of an adhesive and thereafter pressing pile-forming lengths of a yarn into the adhesive to adhere pile-forming lengths to the base layer.

The prior commercial techniques for making bonded fabrics have relied very extensively on the use of PVC plastisol formulations because of the processing disadvantages thought to be associated with the use of other adhesive formulations such as holt melt systems. According to such techniques a polyvinyl chloride plastisol was applied to the base layer prior to positioning the pile-forming yarn relative to the base layer. Then the pile yarn may be positioned into contact with the base layer and the plastisol may then be fused or cured, typically by heating. When attempts were made to substitute other adhesives, such as hot melt adhesives for the PVC plastisol in this process difficulties were encountered. Thus, for instance, with regard to hot melt adhesives, it has generally been thought that the apparatus employed for positioning the yarn may become coated with the adhesive requiring frequent shut downs of the apparatus for cleaning which is, of course, commercially unattractive.

Thus, while PVC plastisol has been the bonding agent of choice in the preparation of pile fabrics it is quite expensive, and it may tend to give off noxious gases when the product is subjected to combustion conditions. Also, while polyvinyl chloride (PVC) plastisol compositions generally may provide good "tuft lock" characteristics, that is its use results in a firm bond of the pile forming yarn to the base layer, PVC plastisols generally may not penetrate to the desired extent into the yarn bundles to effect complete adhesion of all pile yarn fibers of the pile yarn bundle to the pile fabric structure which may result in "fuzzing" of the end product, especially in carpeting end uses.

Another disadvantage typically associated with the prior art techniques for making non-tufted pile fabrics, that is fabrics where the pile yarn is not tufted through the backing but simply adhered to the backing, is that the adhesive is normally applied to the base layer on the side of the base layer facing the pile yarns, and the base layer is normally of a construction such that the adhesive will not flow through it but will substantially remain on that surface with perhaps some penetration into the base layer. Then, if it is desired to apply a backing layer, e.g., a hard back, to the back side of the pile fabric as may be desired in the making of carpet tiles the backing layer must be either adhered directly to the backing layer or an additional process step of applying adhesive to the back side of the support layer may be necessary. In either event, there is created numerous distinct layers in the finished product, namely pile layer, adhesive layer, base layer, another adhesive layer and a hard back layer. Such constructions may inherently have processing disadvantages and be costly to construct. These layers may also be subject to undesired separation during use.

According to the present invention bonded pile fabrics are provided wherein the bonding of the pile-forming yarn to the base layer may be accomplished by means of a hot melt adhesive which is a relatively inexpensive and hence commercially attractive adhesive system, which may advantageously flow into the individual yarn bundles to effect more complete adhesion of all the fibers of the pile forming yarn to the pile fabric product [and which typically does not give off noxious gases when the product is subjected to combustion conditions]. Furthermore, a process and apparatus are provided wherein the hot melt adhesive is applied to the base layer conveniently and in a manner which does not interfere with the machinery employed for positioning the pile yarn. This step in the method may accomplish an additional function, namely that of bonding the individual pile-forming yarns to themselves typically at or near the portion of the yarns nearest the base layer, thereby providing improved performance characteristics to the pile fabric product. In addition according to the invention, the adhesive may be applied to the base layer, which is a liquid-permeable layer, from the back of the base layer and it may be forced through the base layer so that a one step adhesive layer application may both provide a means for bonding the pile yarn to the base layer and also provide a means by which a backing layer may be integrally affixed to the base layer. The resulting product may be less complicated and costly to manufacture and may have fewer separate and distinct layers in the final product where undesired separation may occur.

The pile fabrics of the present invention are hot melt adhesive bonded fabrics which are comprised of a liquid-permeable base layer, a pile forming yarn adjacent to but not tufted through the base layer, in pile forming, preferably folded, fashion; the pile forming yarn having been bonded to the base layer by means of a hot melt adhesive applied to the back of said base layer and forced through said base layer into contact with said pile forming yarn. Pile forming configurations may include the so-called I-tuft configurations, e.g., a non-folded configuration, U-tuft configurations, and loop pile configurations, among others. With regard to the phrase "folded, pile forming fashion," which refers to a preferred embodiment, it should be understood that what is intended is a configuration of the pile yarns where the yarns are provided with at least one fold at the portion of the yarn generally most nearly adjacent to the base layer, e.g., a cut pile configuration. Another "folded" configuration which is contemplated is a loop pile configuration where the pile yarns remain uncut in the form of substantially continuous folded yarns in the final product. A variety of pile configurations both nonfolded and folded are illustrated in the attached drawing. According to the most preferred embodiment the pile yarns are cut to form a folded, cut pile product.

According to the method and apparatus of the present invention a pile forming yarn is positioned in pile forming fashion adjacent to one side of a liquid-permeable base layer. Thereafter a hot melt adhesive, heated to at least its softening point is applied to the base layer on the opposite side of the base layer from the side adjacent to the pile forming yarn. According to the next step of the method a hot melt adhesive may be forced, either simultaneously with its application or in a separate step, through the base layer into bond forming contact with the pile forming yarn, and the adhesive is then allowed to cool, either passively or by active cooling to a temperature below its softening temperature to thereby bond the pile forming yarn to the base layer. The apparatus includes a means for applying the adhesive and forcing it through the base layer. It is to be understood that the apparatus is not limited to means for applying only a hot melt adhesive but may include other bonding compositions commonly used in the making of bonded fabrics such as, for instance, polyvinyl chloride plastisol formulations, etc.

According to a preferred embodiment of the present invention a method and apparatus are provided wherein two continuous, liquid-permeable base layers are positioned in a passage where they lie in substantial parallel relationship to one another at a predetermined distance from one another; at least one continuous pile forming yarn is driven by folder blades alternatively against the opposing surfaces of said base layers when they are at or near the entrance to the above mentioned passage in such a way as to position the pile forming yarn relative to the base layers and to fold it zig-zag; thereafter applying to the back of said base layers a hot melt adhesive; forcing said hot melt adhesive through said base layers so that said hot melt adhesive contacts said pile forming yarn; and cooling said hot melt adhesive to a temperature below its softening point to thereby bond said pile forming yarn to said base layers. This step in the method may accomplish an additional function, namely that of bonding the individual pile forming yarns to themselves typically at or near the portion of the yarns nearest the base layer, thereby providing improved performance characteristics to the pile fabric product. Thereafter, the base layers may be separated from one another to form two continuous, hot melt adhesive bonded products. Typically such separation may be accomplished by means of a stationary or moving knife blade positioned between the base layers which cuts the pile yarns along the entire width of the joined base layers to provide the hot melt adhesive bonded products.

The yarn used in forming the pile may be made of any type of fiber know to be useful for fusion bonded fabrics such as carpets, for example nylon, acrylics, polyester, wool, cotton and rayon.

The hot melt adhesive compositions which may be employed according to the present invention include a wide range of hot melt adhesives which have been available for many years. Typically such compositions may have a melt viscosity of less than about 200,000 cps, preferably less than about 100,000 cps at 300° F. Examples include, for instance, blends of ethylene/vinyl ester copolymer, petroleum wax and a thermoplastic resin as disclosed in U.S. Pat. No. 3,551,231 (incorporated by reference). Other suitable blends which may be used include ethylene/vinyl ester copolymer, low molecular weight, low density polyethylene, microcrystalline wax, aliphatic thermoplastic hydrocarbon resin, dicyclopentadiene alkylation polymer, antioxidant and filler as disclosed in U.S. Pat. No. 3,684,600 (incorporated by reference). Other suitable hot melt adhesives of the ethylene/vinyl ester type which may be used are disclosed in U.S. Pat. Nos. 3,583,936, 3,676,280, 3,684,600, 3,745,054, 3,723,371, 3,911,185, 3,914,489 and 4,012,547 (all incorporated by reference). Other hot melt adhesive formulations which may be employed include those of the atactic polypropylene type. In general such compositions may contain a predominant amount, e.g., from about 10 parts to about 100 parts or more, preferably from about 60 parts to 100 parts, by weight atactic polypropylene; from 0 to about 70 parts of another compatible thermoplastic material such as hydrocarbon resins, waxes, polyethylene, especially linear, low density polyethylene; isotactic polypropylene, polyisobutylene and polybutene-1. Fillers in widely varying amounts may be added to such compositions as will be readily apparent to those skilled in the art.

Other compatible thermoplastic materials which may be employed in the adhesive formulation include ethylene/ethyl acrylate, polyacetals, polyesters, polystyrene, polyacrylonitrile, polyacrylic ester, polymethacrylic ester, polyvinyl chloride, polyvinylidene chloride, polyvinyl acetate, polyvinyl acetal, polyvinyl ether, polytetrafluoroethylene, polyamide, coumarone-/indene resins, natural resins, hydrocarbon resin, bitumen and others.

The amount of hot melt adhesive applied may vary widely, based upon the particular pile yarn employed, base layer and properties desired in the pile fabric product. In general the amount employed may be from about 2 to about 200 ounces, preferably about 4 to about 80 ounces per square yard. Tuft binds for carpet yarns that may be achieved according to the invention may be from about 2 to about 20 pounds.

Suitable liquid-permeable base layers which may be employed in the product and process of the invention include woven fabrics, knitted fabrics, non-woven scrims, felted materials, or even flexible, foraminous materials.

Where it is desired to provide a hot melt adhesive bonded pile fabrics of the present invention as floor covering products, especially carpet tiles, it may be desirable to apply any of a wide variety of suitable, resilient backing layers to the fabrics. Such carpet tiles are also considered to be within the scope of the present invention. The backing layer may be formed, for example, from a suitable thermoplastic material such as blends containing ethylene/vinyl acetate copolymers, atactic polypropylene, bitumen hydrocarbon resins, waxes, synthetic and natural rubbers.

The backing may be bonded to the base layer by means of the same adhesive applied to the base layer to bond the pile fabrics. Thus, the resulting product may have fewer separate layers subject to separation than known carpet tiles. This is, rather than having pile layer, adhesive layer, base layer, another adhesive layer and backing layer, the present carpet tile may typically have a pile layer; a single, integral, hot melt adhesive layer into which the base layer may be disposed or suspended, and a backing layer bonded to the composite by means of the hot melt adhesive. The backing layer may be provided with at least one stiffening and stabilizing membrane, such as woven or nonwoven glass fibers.

After the backing has been applied the consolidated material may then be severed by suitable cutting means into a carpet tile by any of a variety of techniques which are well-known to those skilled in the art.

The resulting carpet tile product is suitable for use as a floor covering in home and/or commercial use in an office environment where substantial high stress conditions (e.g., wheeled traffic) are applied across the tiles. The tiles typically have a dense pile and may not require adhesives for installation. The individual modules may be replaced or rotated as necessary or desired. The carpet tiles may also have excellent dimensional stability with substantially no curling, slipping, buckling, stretching or shrinking. In addition the carpet tiles may have low smoke emission and low "fuzzing" characteristics.

The invention may be further understood by reference to the drawings and accompanying description thereof. It is to be understood, however, that various changes may be made without departing from the scope or spirit of the invention which is to be limited only by the scope of the appended claims. Referring now to the drawings:

Figure 1:
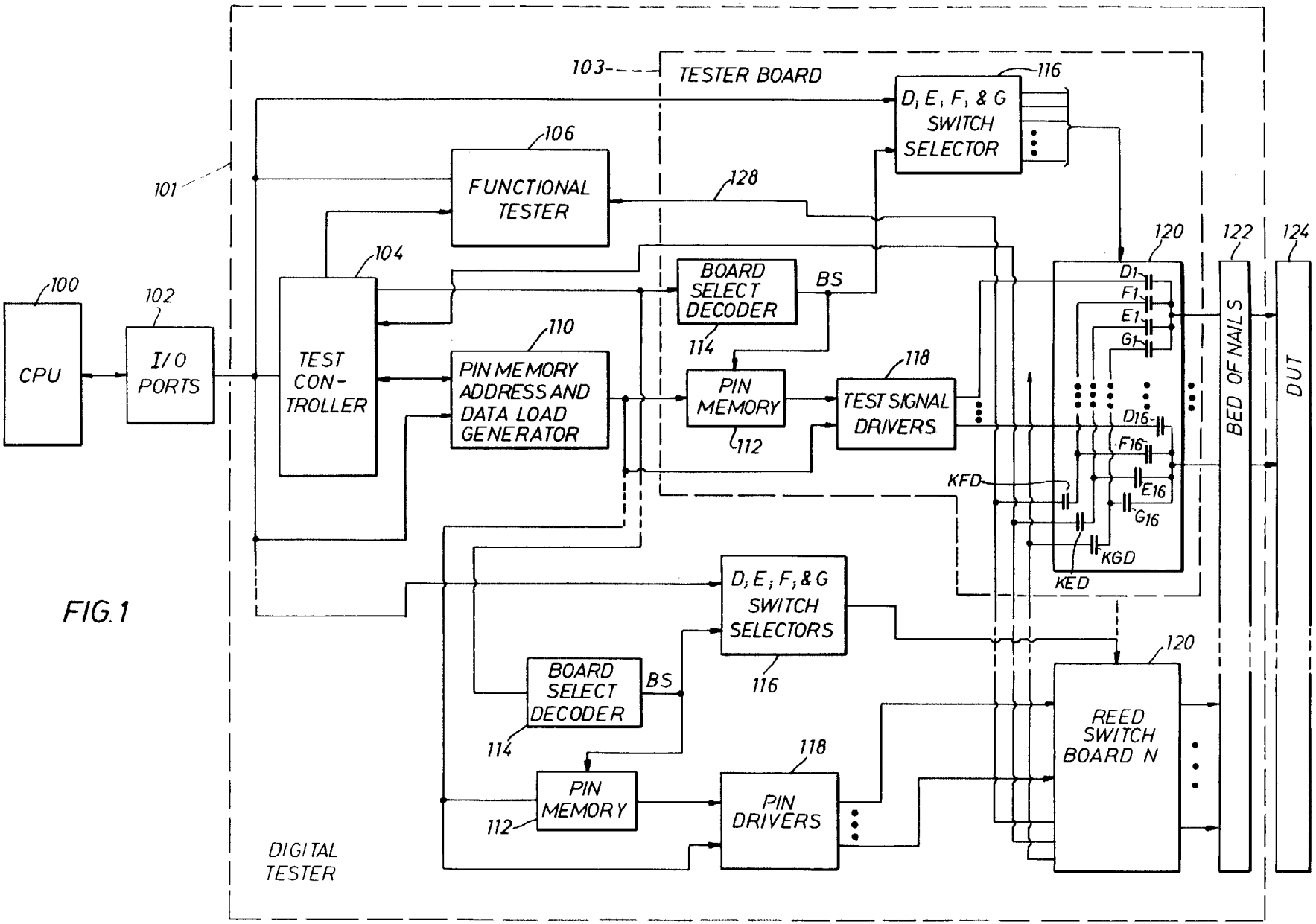
FIG. 1 is an elevation view of the apparatus.

Referring now to FIG. 1, carpet yarn 10 is supplied from a yarn source (not shown) over and around guide rolls 12 and 14 and down to the vertical guides 16. Base layer 17 is supplied from rolls 18 into position between the guides 16. As the yarn 10 enters between the vertical guides 16 the folding blades 20 and 22 alternately displace the yarn in a zig-zag fashion into one or the other of the base layer sheets 17 as the carpet backing is being drawn downwardly. Pivotally mounted bladelets 24 and 26 may assist in the folding of the yarn. Folding blades 20 and 22 are mounted, respectively, to connecting rods 28 and 30. Connecting rod 28 is pivotally connected to pivot shafts 32 and 34 and connecting rod 30 is pivotally connected to pivot shafts 36 and 38 through suitable links (not shown). The shafts 32 and 38 are oscillated by an oscillating crank arm mechanism (not shown).

It should be noted that the blade 20 is out of phase with the blade 22 so that when the blade 22 is being pivoted inwardly as shown in FIG. 1 the blade 20 is being pivoted outwardly and vice versa to provide a zig-zag configuration of the yarn between the carpet base layers 17 which are liquid-permeable, that is permeable to the adhesive to be applied.

After the yarn has been positioned in zig-zag configuration between the carpet base layers 17, hot melt adhesive 80 maintained in troughs 82 is applied to applicator rolls 84 by passing through gaps 86 between the side walls 88 of the troughs 82 and the applicator rolls 84. The hot melt adhesive may be maintained in the liquid phase by heating means not shown. The amount of adhesive applied to the applicator rolls may be adjusted as desired by moving troughs 82 upwardly or downwardly as indicated. Applicator rolls 84 are caused to move preferably in the directions indicated by drive means not shown whereby adhesive is applied to the carpet base layers 17 and simultaneously forced through the base layers into contact with yarn 10. The rolls may also be forced to move in the opposite direction to the direction indicated if so desired.

After the hot melt adhesive has been applied to the carpet base layer and forced through it into contact with the carpet yarn, it may be converted into the solid phase by cooling means 90 to form a bond between the carpet yarn 10 and the carpet base layers 17. Cooling means 90 may be supplied with air blowers 92, cooling coils 94 over which air is forced and thereby cooled prior to exiting the cooling means through exit ducts 96 into contact with the carpet base layers to thereby cool the hot melt adhesive causing it to revert to the solid phase. The yarn 10 may then be severed, generally in the middle of the base layers 17 by cutting blade 98 to provide, simultaneously, two sheets of carpet.

Figures 2, 2B:
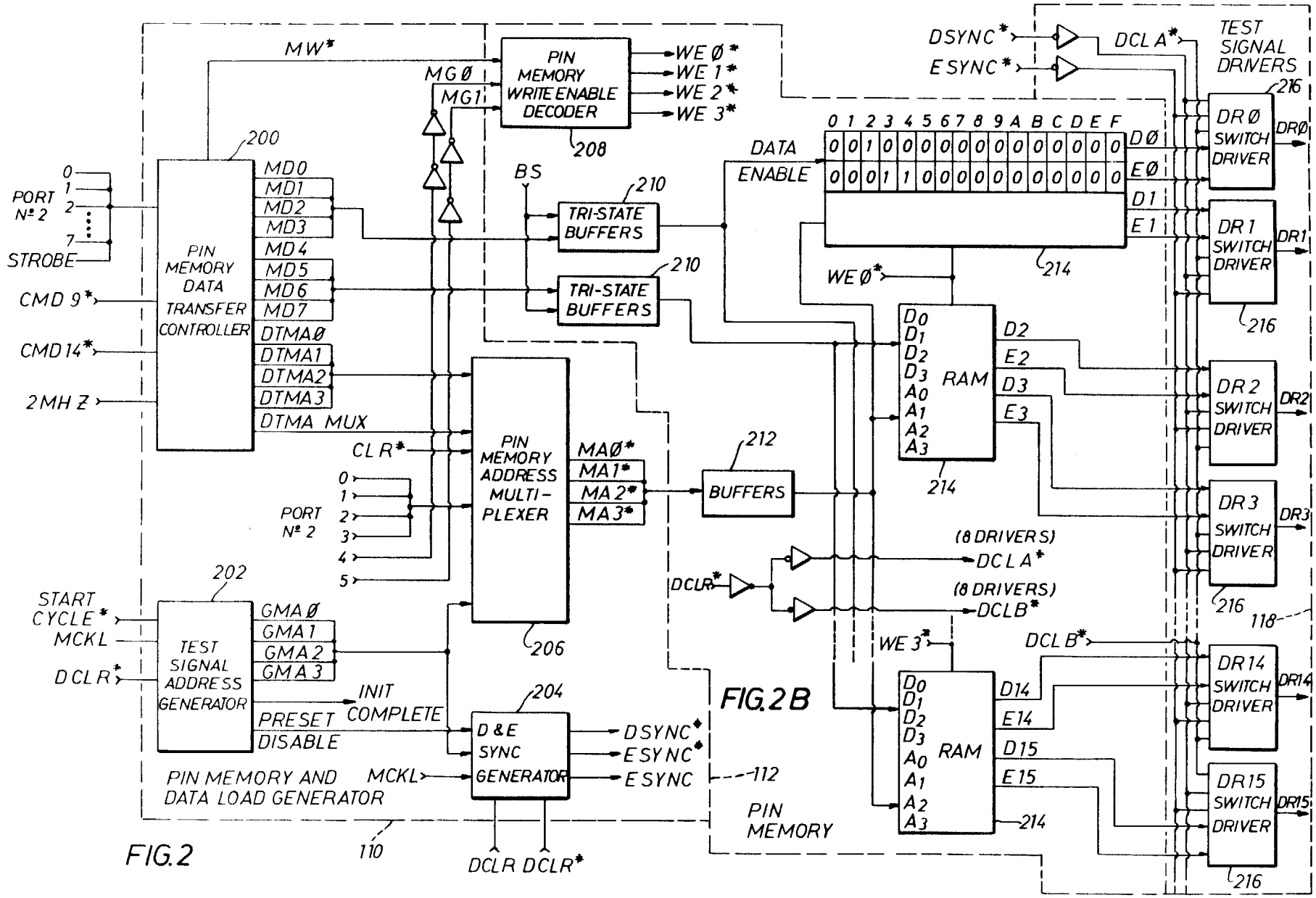
FIGS. 2 through 4 illustrate various embodiments for forcing the adhesive through the base layer.

FIG. 2 is an enlarged view of the hot melt adhesive applicator means embodiment 78 shown in FIG. 1. Numbers in FIG. 2 corresponding to numbers used in preceding drawings refer to corresponding parts of the apparatus. The gaps 86 by means of which the amount of hot melt adhesive to be applied may be adjusted as desired are more clearly illustrated. Also shown in FIG. 2 are pre-heating plates 101 which may be provided to pre-heat the base layers prior to application of hot melt adhesive and to facilitate such application.

Figure 3:
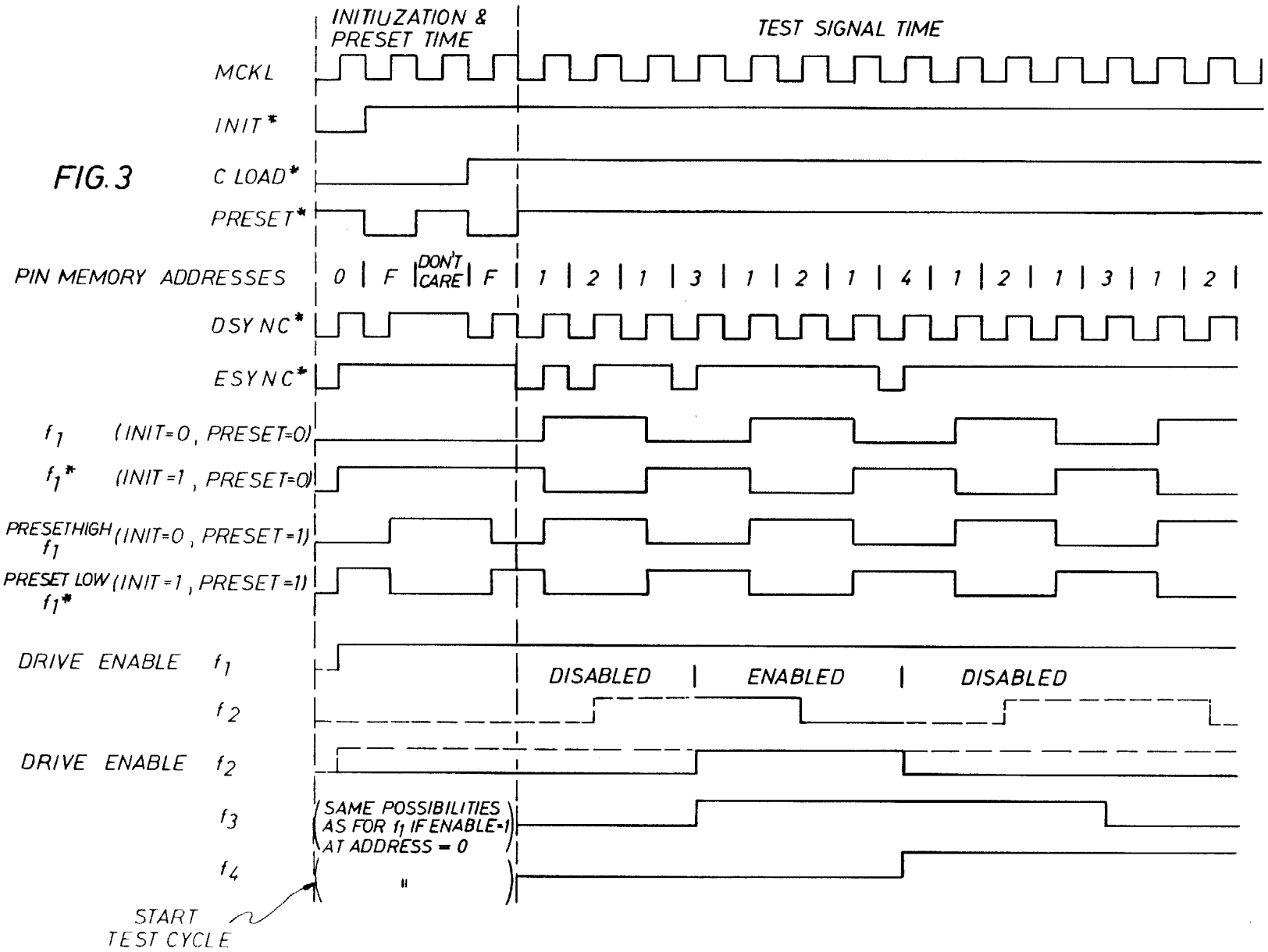

FIG. 3 illustrates an alternative embodiment wherein the hot melt adhesive is maintained in a reservoir sided on one side by base layers 17 and on the other side by doctor blades 104. The adhesive 80 is allowed to contact the carpet backings and is forced therethrough by the tips 106 of doctor blades 104.

Figure 4:
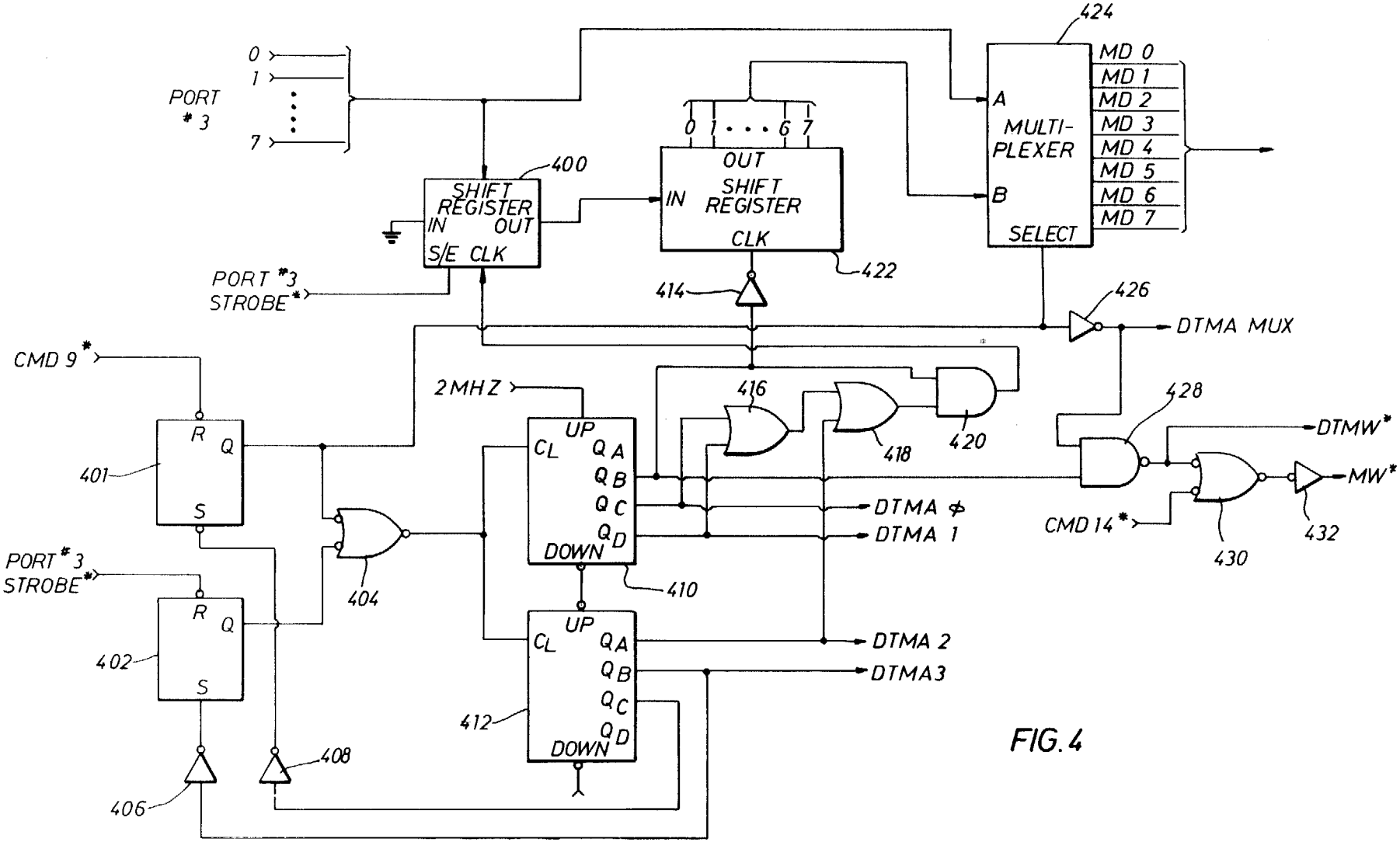

FIG. 4 illustrates yet another embodiment of the invention where the hot melt adhesive is maintained in tanks 108. Application of the adhesive to the base layers 17 is accomplished by drawing the adhesive out of the tanks 80 through pumps 119 into manifolds 112. The adhesive is then forced from the openings 114 in manifolds 112 under sufficient pressure to force the adhesive through the carpet base layers 17 into contact with carpet yarn 10.

Figure 5:
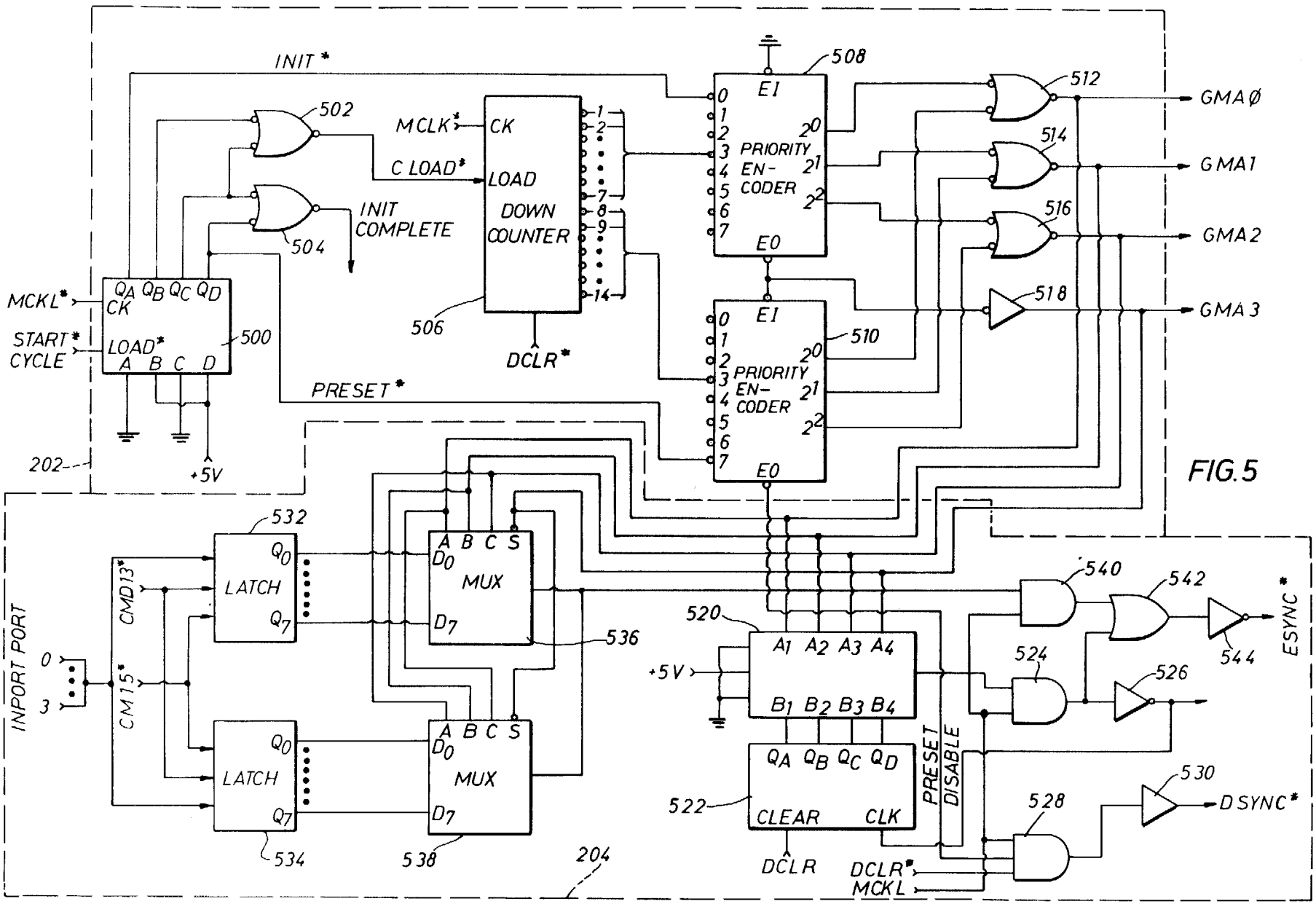
FIGS. 5 through 8 illustrate various pile forming configurations which may be employed in the hot melt adhesive bonded pile fabrics of the present invention.
Figure 6:
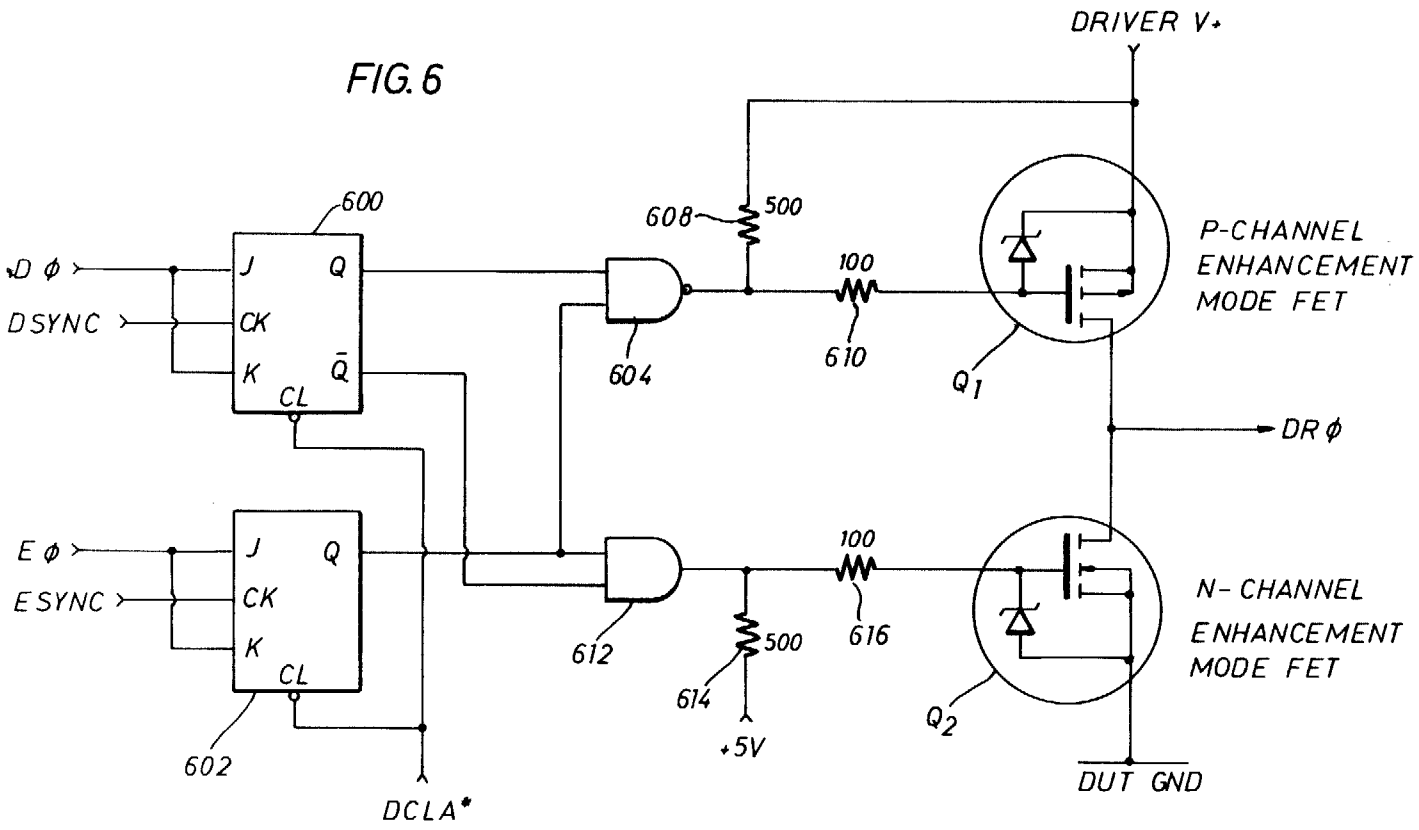
Figure 7A:
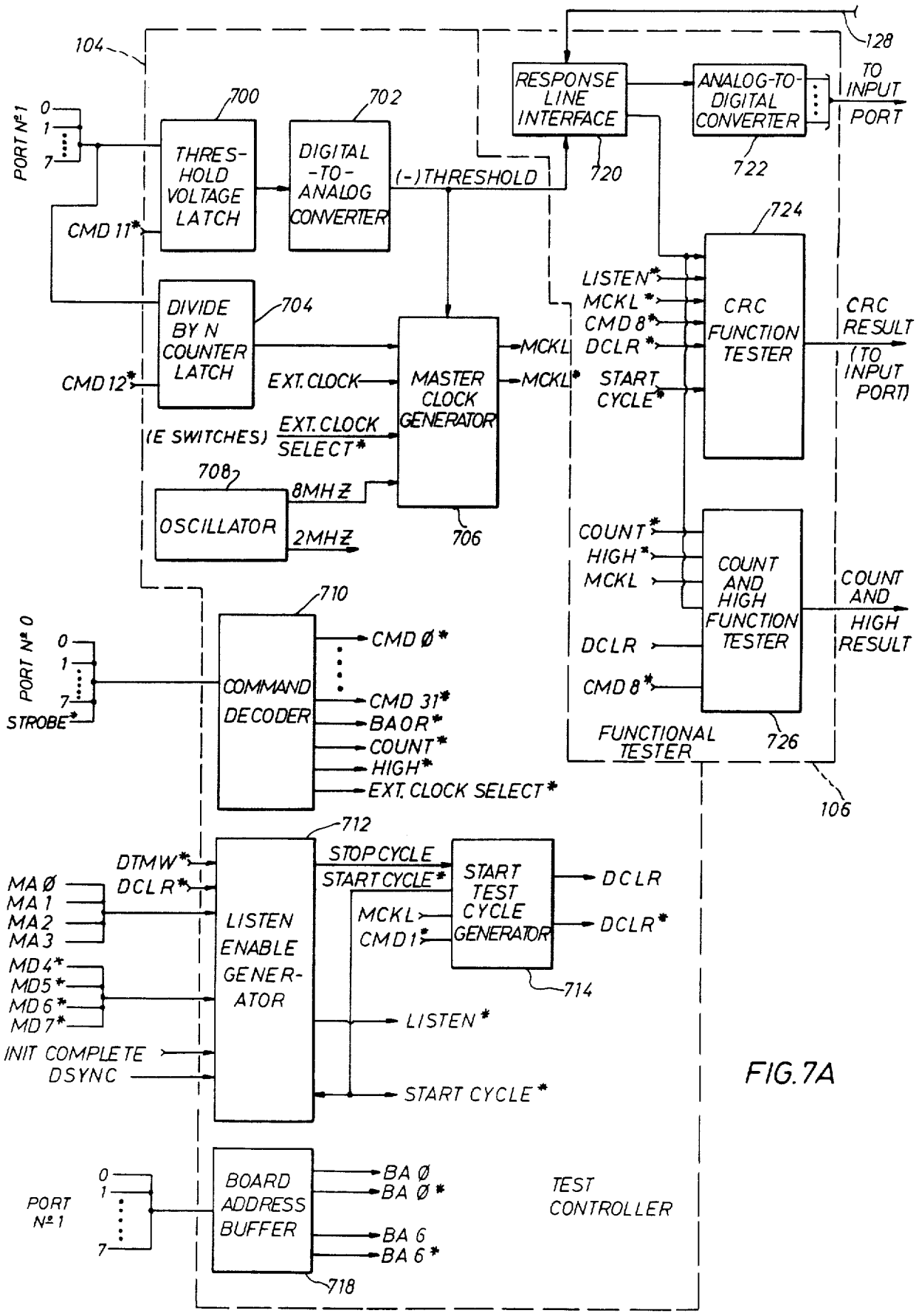
Figure 7B:
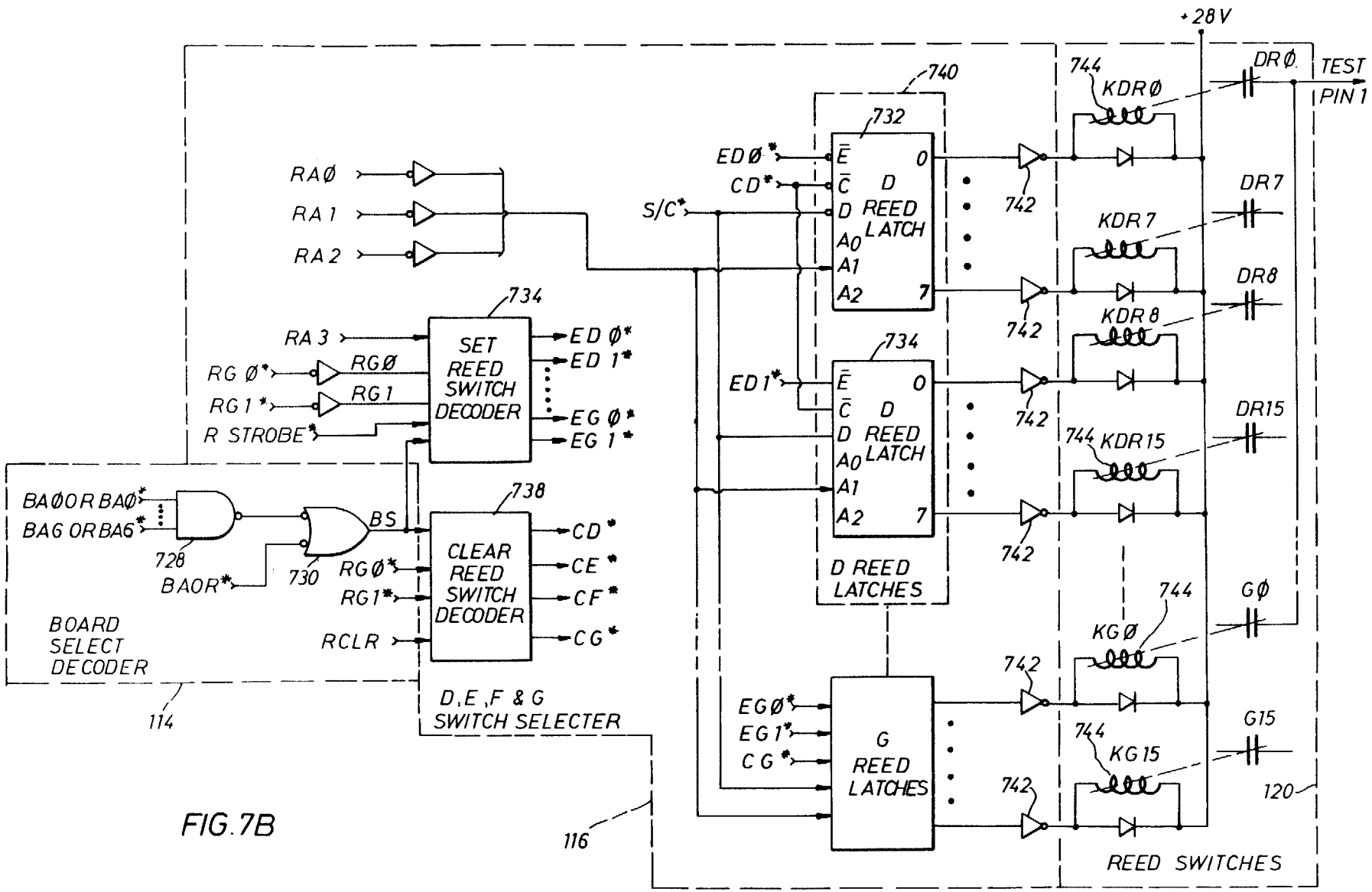
Figure 8:
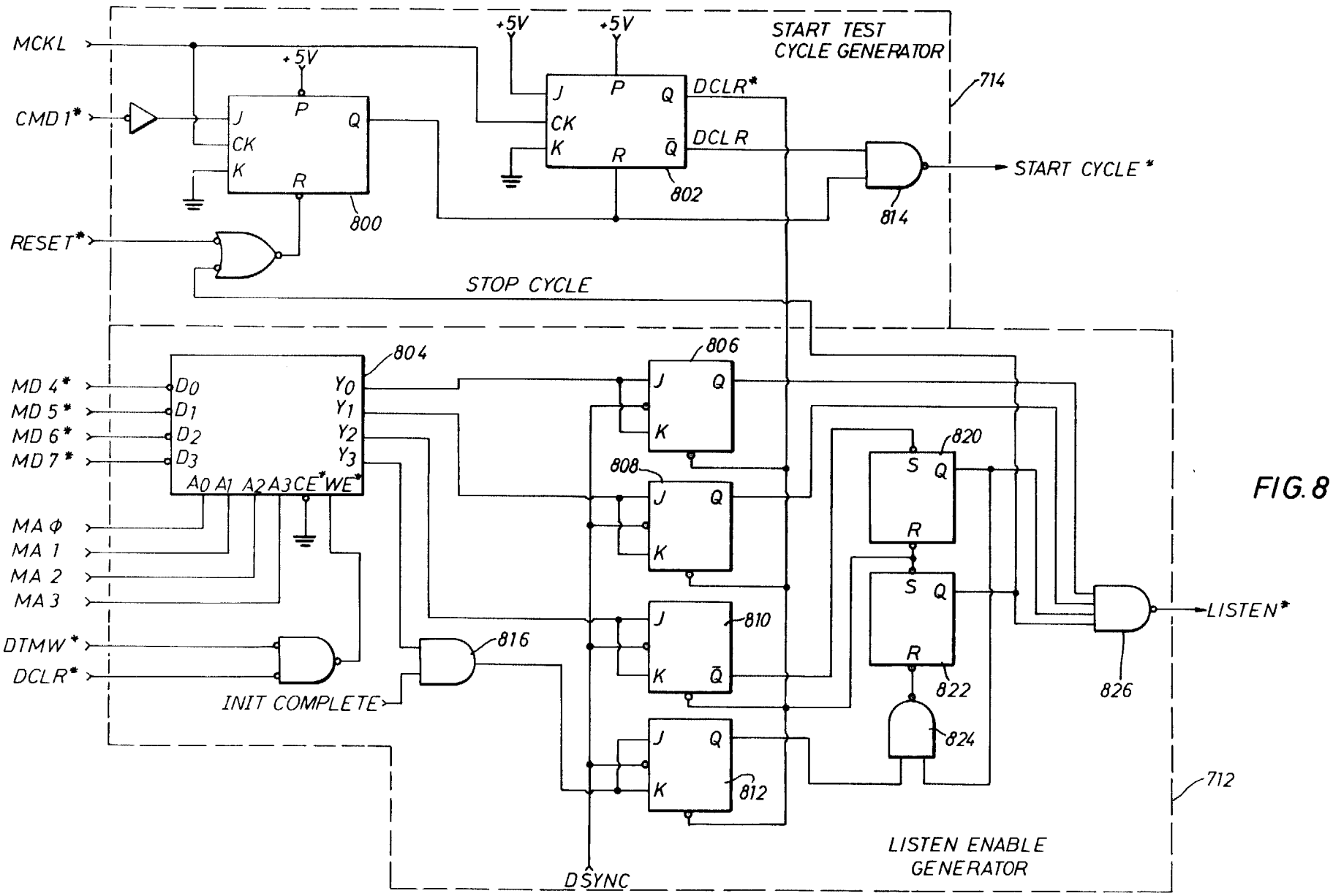
Figure 7:
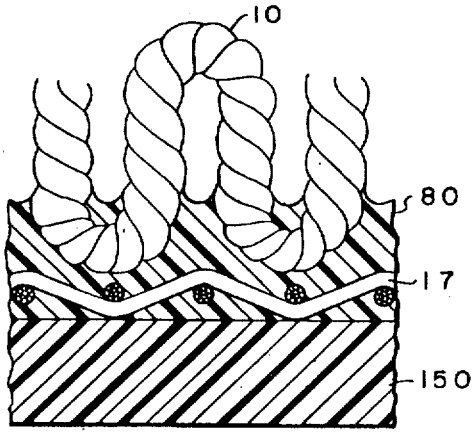
Figure 8:
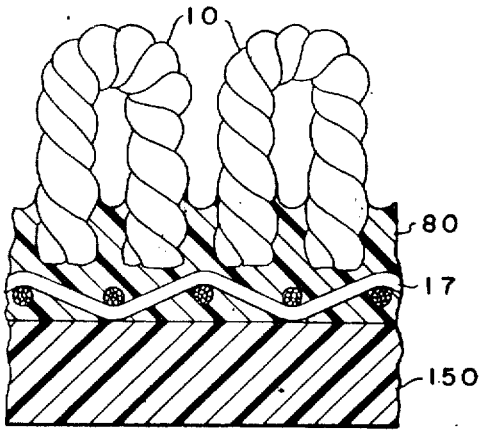
Figure 9:
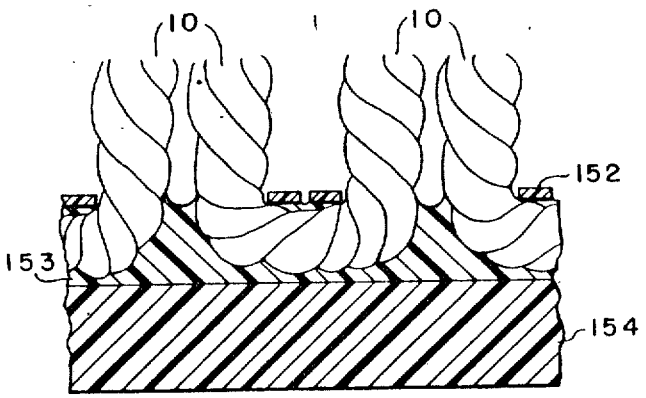
Figure 10:
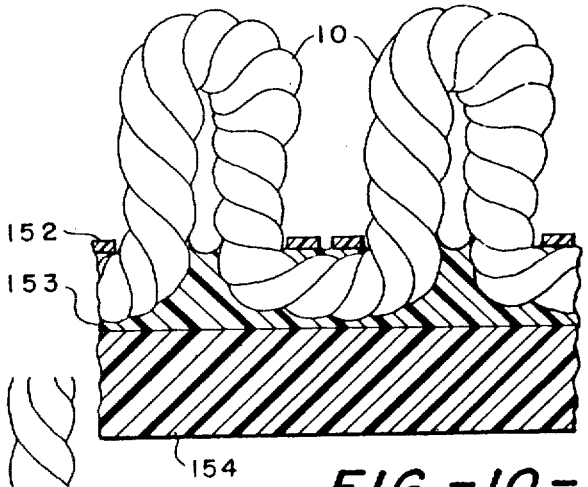

FIG. 5 illustrates an embodiment of the present invention showing an I-tuft configuration of the pile yarns, base layer 17 in the form of a relatively open-weave, adhesive permeable fabric. Hot melt adhesive 80 is shown as a continuous layer into which the base layer 17 has become embedded at the base thereof. A backing layer 150 made of a thermoplastic material is shown as having been bonded to the pile fabric by means of the same hot melt adhesive 80 used to bond the pile forming yarns. FIGS. 6, 7 and 8 illustrate some folded configurations of the pile forming yarns which may be preferred. Identifying numbers refer to the same structural components as in FIG. 5. FIG. 6 shows a folded, cut pile configuration. FIG. 7 shows a loop pile configuration. FIG. 8 shows another folded pile configuration where the folded portion of the yarn is on the surface giving the appearance of a loop pile, although the loops are not joined to one another at their base. This configuration provides in essence a loop pile product while simultaneously offering the advantages of, for instance, yarn savings of the so-called I-tuft configuration.

Figure 9:
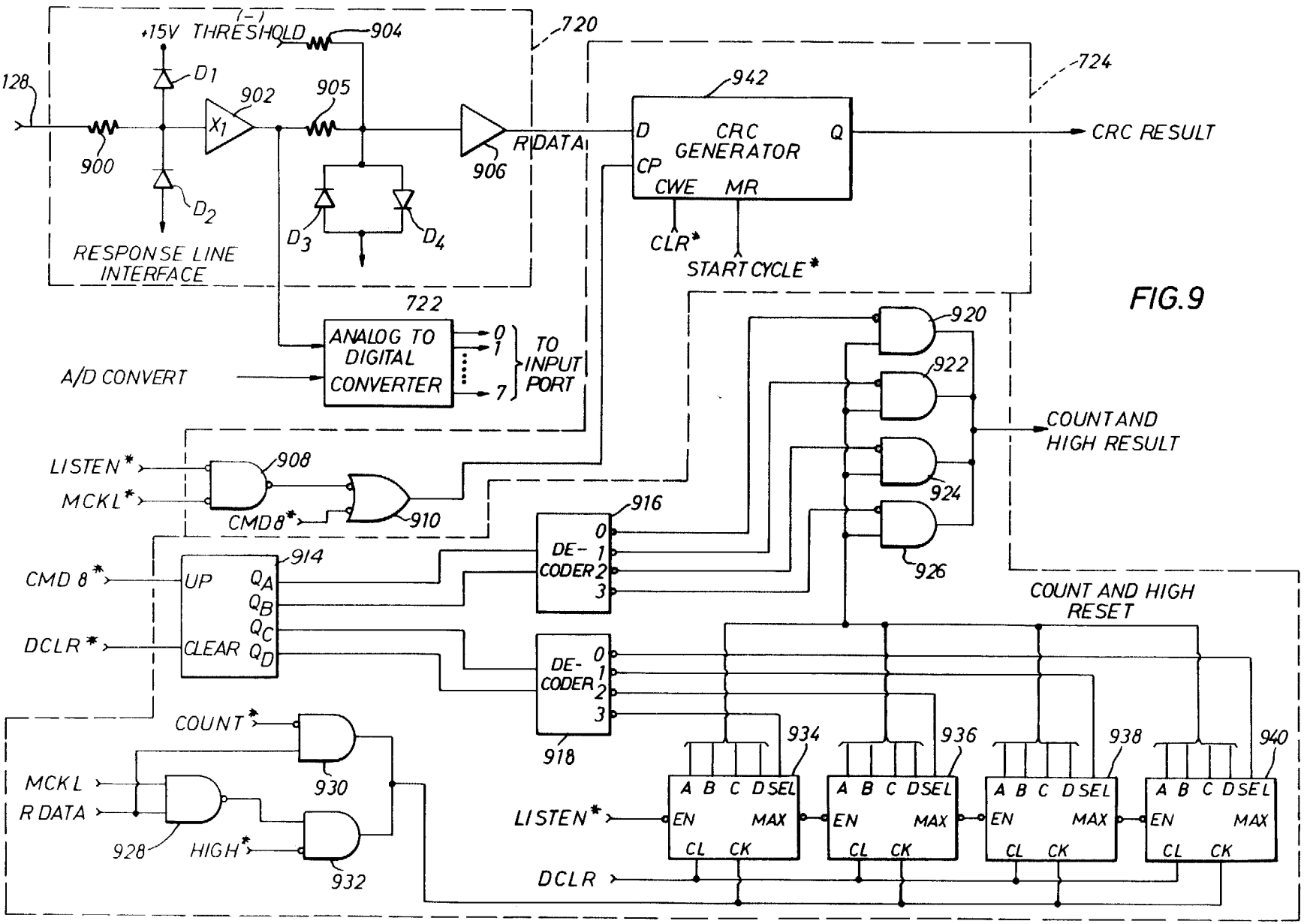
FIGS. 9 and 10 illustrate conventional tufted pile fabric configurations showing the pile yarns tufted through a base layer.
Figure 10:
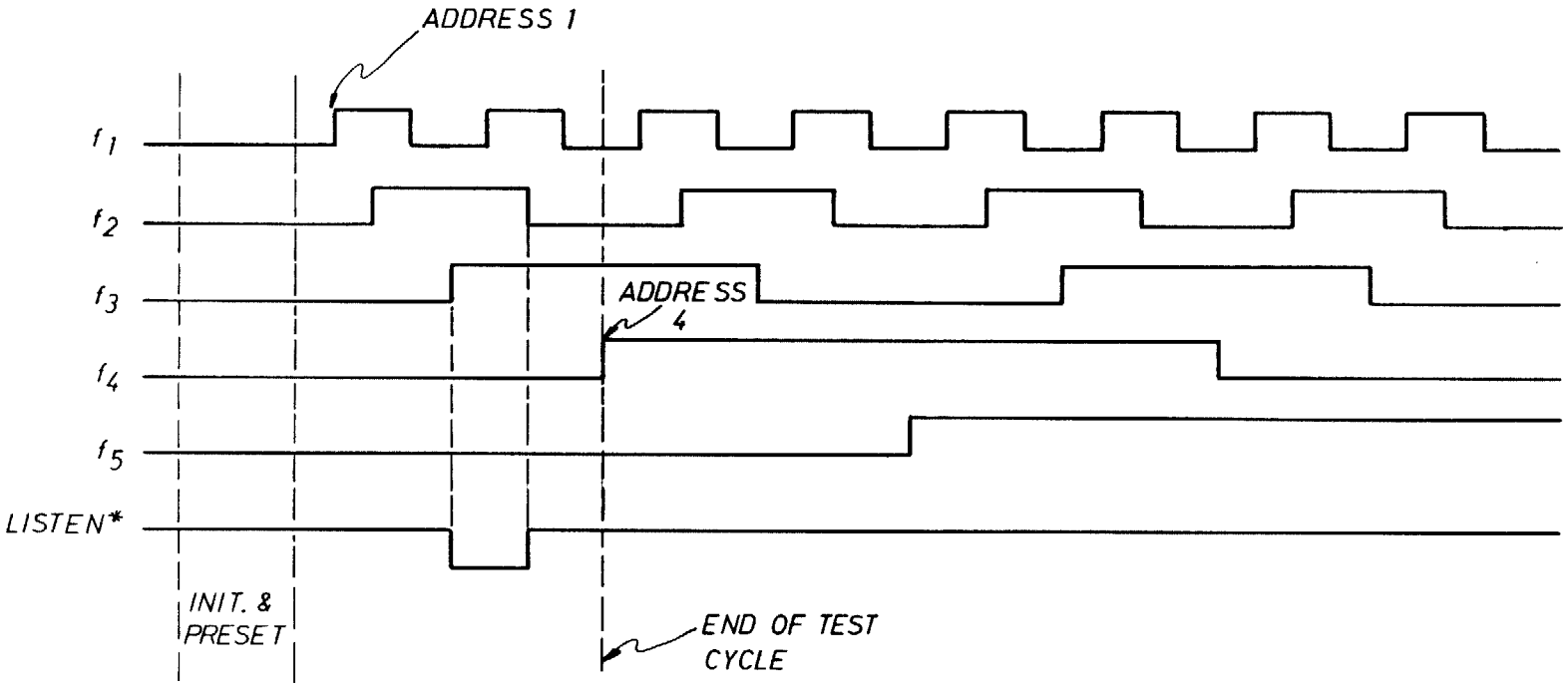
Figure 1:
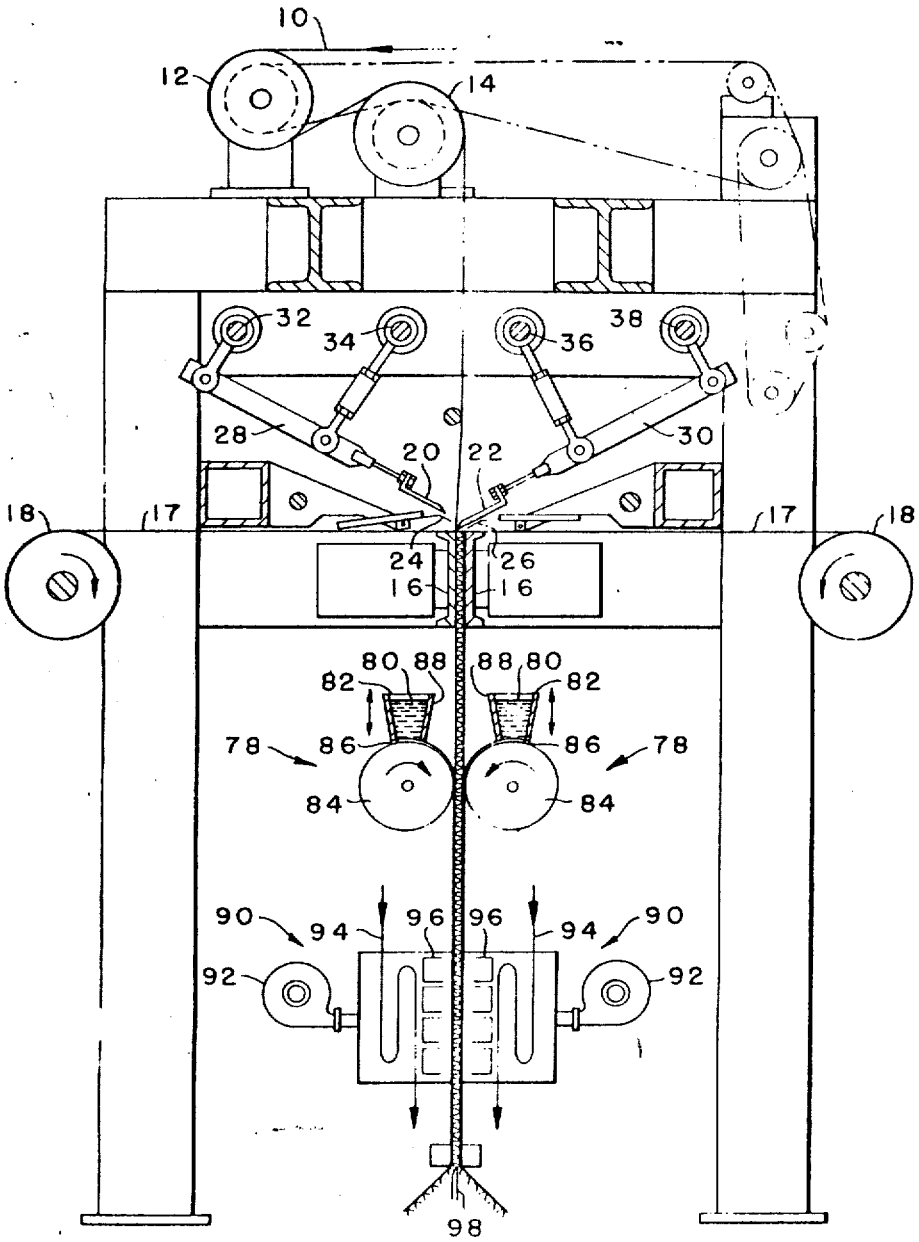
Figure 2:
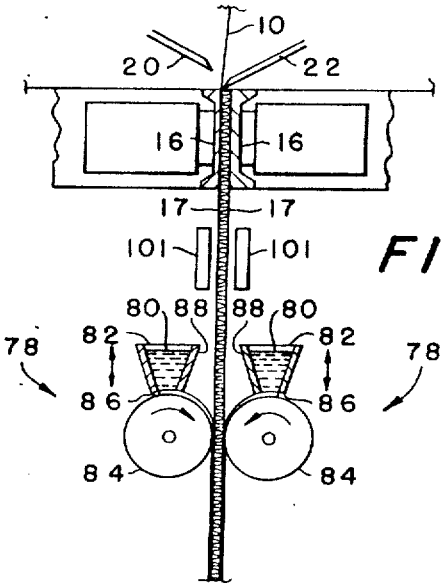
Figure 3:
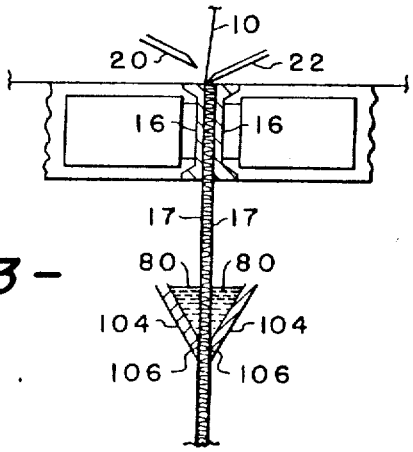
Figure 4:
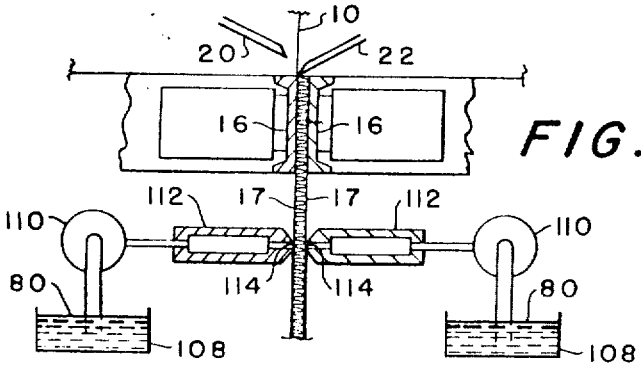
Figure 5:
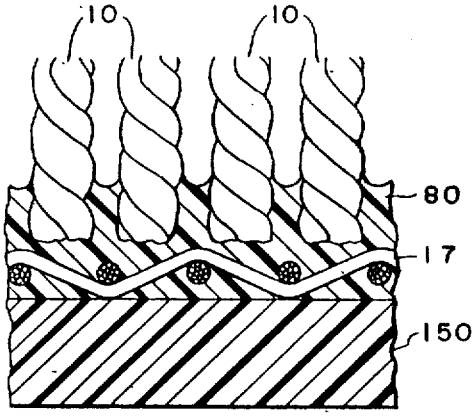
Figure 6:
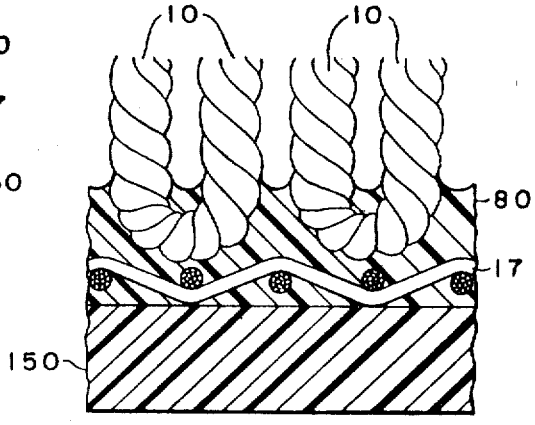
Figure 11:
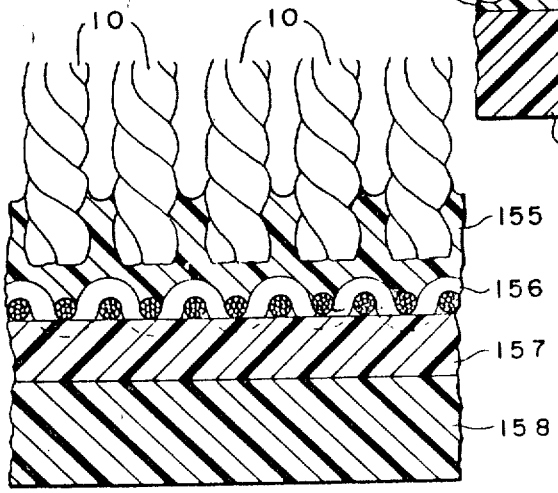
FIG. 11 illustrates a conventional I-tuft bonded fabric configuration showing a relatively impermeable base layer.

FIG. 9 illustrates a conventional cut pile tufted carpet tile having pile yarn 10 tufted through a conventional, polypropylene backing 152, adhesive layer 153, and backing layer 154. FIG. 11 differs from FIG. 10 only in the illustration of a loop pile tufted configuration rather than a cut pile configuration. FIG. 11 illustrates conventional, multilayered I-tuft bonded product showing the configuration of pile yarns 10, adhesive layer 155, adhesive impermeable base layer 156 in the form of tightly woven jute, another adhesive layer 157 by means of which backing layer 158 may be adhered to the base layer.

The invention may be further understood by reference to the following examples which are not to be construed as unduly limiting the invention.

Example 1

Using a machine similar to that shown in FIG. 1, a nylon carpet yarn was folded between layers of a woven rayon fabric. By means of an elecrically heated plate mounted on one side only, directly below the vertical guide 16, the yarn loops in contact with the fabric at this side only were lightly fused to the fabric. By omitting the hot-melt adhesive application and the cutting by the blade, a loop-pile fabric was produced on removal of the other non-adhering rayon fabric.

A hot-melt adhesive composition was formulated using atactic polypropylene, hydrocarbon resin and wax, and a molten film of this adhesive cast on a hot-plate at about 350° F. A portion of the loop-pile fabric made as described above was contacted on the loop-pile face with a piece of non-woven glass scrim. This assembly was then placed with the glass in contact with the hot-melt adhesive, rolled to force the adhesive through the glass and into the loop-pile yarns, and cooled. Then the glass side of the sandwich was laminated under heat and pressure to a 60 mils thick sheet of Keldax®, (a trademark of DuPont for a filled hot-melt composition based on a copolymer of ethylene and vinyl acetate). A blade was then used to cut the yarn sandwich between the rayon fabric and the glass, thus producing two cut-pile carpets.

Single yarns were then pulled from the carpet bonded by the hot-melt adhesive to the glass. The average force required was found to be 4.6 pounds.

Example 2

Used a machine similar to that of FIG. 1 with a heater plate as described in Example 1. There was a rayon fabric on the same side as the heater plate, an open leno-woven glass scrim fabric on the non-heated side, and a nylon carpet yarn folded into the gap. The glass side of the sandwich was contacted with a heated applicator (identified as Number 84 in FIG. 1), above which was mounted a trough 88 containing the following formulated hot-melt adhesive at about 300° F.:

| | |
|---|---|
| Elvax ® 350 (DuPont ethylene/vinyl acetate copolymer melt index - 19) | 30 parts |
| Shellmax 400 (shell micro crystalline wax, melting point 177° F.) | 45 parts |
| Piccopale 100 (Hercules hydrocarbon resin, softening point: 212° F.) | 25 parts |

By varying the speed of the application roll relative to the yarn sandwich, and the gap between the trough and the applicator roll, various levels of adhesive were applied to the yarn loops through the woven glass scrim. After cooling and cutting of the yarns to make two cut-pile carpets, the tuft bind was measured on the glass backed carpet portion. Values varied from 4 pounds tuft bind with 15 ounces/square yard of adhesive to 6 pounds with 50 ounces/square yard of adhesive.

Example 3

A hot-melt adhesive was formulated as follows:

| | |
|---|---|
| Elvax 350 | 30 parts |
| UE 653-04 (U.S. Industries ethylene/vinyl acetate copolymer, melt index: 375) | 10 parts |
| Shellmax 500 (Shell micro crystalline wax, melting point 171° F.) | 35 parts |
| Piccopale 100 | 25 parts |

Using the procedure of Example 2, this adhesive was applied to the glass side of the yarn sandwich giving tuft bind ranging from 7 to 10 pounds with an adhesive pick-up of 32 to 48 ounces/square yard.

Example 4

With the following hot-melt adhesive formulation:

| | |
|---|---|
| Elvax 260 (DuPont ethylene/vinyl acetate copolymer melt index: 6) | 35 parts |
| Shellmax 400 | 40 parts |
| Piccopale 100 | 25 parts |

and using the procedure of Example 2, obtained a tuft-bind of 5 pounds with as low as 8 ounces/square yard of adhesive. With 36 ounces of adhesive, the tuft-bind was 9 pounds.

Example 5

Used the same procedure as for Example 2, except that the heated applicator roll/trough to apply the hot-melt adhesive was replaced by a doctor blade applicator on the glass side as depicted in FIG. 3. The adhesive was:

| | |
|---|---|
| Elvax 660 (DuPont ethylene/vinyl acetate copolymer melt index: 2.5) | 20 parts |
| D-82 (Hercules experimental hot-melt adhesive) | 80 parts |

With an adhesive pick up in the range of 5–20 ounces/-square yard following from the relatively high viscosity of this adhesive, the tuft-bind averaged 4 pounds.

Example 6

Used the method of Example 5, but with a lower viscosity adhesive prepared thus:

| | |
|---|---|
| Atactic polypropylene | 83 parts |
| Dowlex (Dow linear low density polyethylene, melt index: 20) | 17 parts |

A 3 pound tuft-bind was obtained with adhesive pick ups in the range 14–30 ounces/square yard.

What is claimed is:

1. A hot melt adhesive bonded pile fabric which comprises a liquid-permeable base layer, a pile forming yarn adjacent to but not tufted through the base layer in pile forming fashion, the pile forming yarn having been bonded to the base layer by means of a hot melt adhesive applied to the back of said base layer and forced through the base layer into contact with said pile forming yarn.

2. The pile fabric of claim 1 wherein said pile forming yarn is provided adjacent to said base layer in folded fashion.

3. A carpet tile comprising a liquid-permeable base layer, a pile forming yarn adjacent to, but not tufted through the base layer in folded, pile forming fashion, the pile forming yarn having been bonded to the base layer by means of a hot melt adhesive applied to the back of said base layer and forced through the base layer into contact with said pile forming yarn; said carpet tile including a backing layer of thermoplastic material having been bonded to said base layer by means of said hot melt adhesive.

4. The carpet tile of claim 3 wherein said backing layer includes at least one stiffening and stabilizing membrane.

5. The carpet tile of claim 4 wherein the stiffening and stabilizing membrane comprises glass fibers.

* * * * *

UNITED STATES PATENT AND TRADEMARK OFFICE

CERTIFICATE OF CORRECTION

PATENT NO. : Re. 31,826

DATED : February 5, 1985

INVENTOR(S) : Greville Machell

It is certified that error appears in the above-identified patent and that said Letters Patent is hereby corrected as shown below:

The title page should be deleted to appear as per attached title page.

The sheets of Drawings Consisting of Figures 1-11 should be deleted to appear as per attached sheets consisting of Figures 1-11.

Signed and Sealed this

*Twenty-seventh* Day of *August 1985*

[SEAL]

*Attest:*

DONALD J. QUIGG

*Attesting Officer* *Acting Commissioner of Patents and Trademarks*

United States Patent [19]

Machell

[11] E Patent Number: Re. 31,826

[45] Reissued Date of Patent: Feb. 5, 1985

[54] HOT MELT ADHESIVE BONDED PILE FABRICS

[75] Inventor: Greville Machell, Spartanburg, S.C.

[73] Assignee: Milliken Research Corporation, Spartanburg, S.C.

[21] Appl. No.: 503,206

[22] Filed: Jun. 10, 1983

Related U.S. Patent Documents

Reissue of:

[64] Patent No.: 4,371,576
Issued: Feb. 1, 1983
Appl. No.: 304,486
Filed: Sep. 22, 1981

[51] Int. Cl.[3] ..... D04H 11/08

[52] U.S. Cl. ..... 428/92; 156/72; 428/93; 428/94; 428/95; 428/96; 428/97

[58] Field of Search ..... 428/85, 92, 93, 94, 428/95, 96, 97; 156/72

[56] References Cited

U.S. PATENT DOCUMENTS

| | | | |
|---|---|---|---|
| Re. 29,988 | 5/1979 | Hospied | 156/72 |
| 2,101,905 | 12/1937 | Hopkinson | 154/2 |
| 3,411,966 | 11/1968 | Couquet | 428/92 |
| 3,709,711 | 1/1973 | Boultinghouse | 156/72 |
| 3,790,426 | 2/1974 | Bylund | 156/72 |
| 3,905,857 | 9/1975 | Short | 428/92 |

*Primary Examiner*—Marion McCamish
*Attorney, Agent, or Firm*—H. William Petry; Terry T. Moyer

[57] ABSTRACT

A hot melt adhesive bonded pile fabric is provided which comprises a liquid permeable base layer; a pile forming yarn adjacent to the base layer in pile forming fashion but not tufted through the base layer; the pile forming element having been bonded to the base layer by means of a hot melt adhesive applied to the back of said base layer. A method and apparatus for making fusion bonded, pile fabrics are also provided.

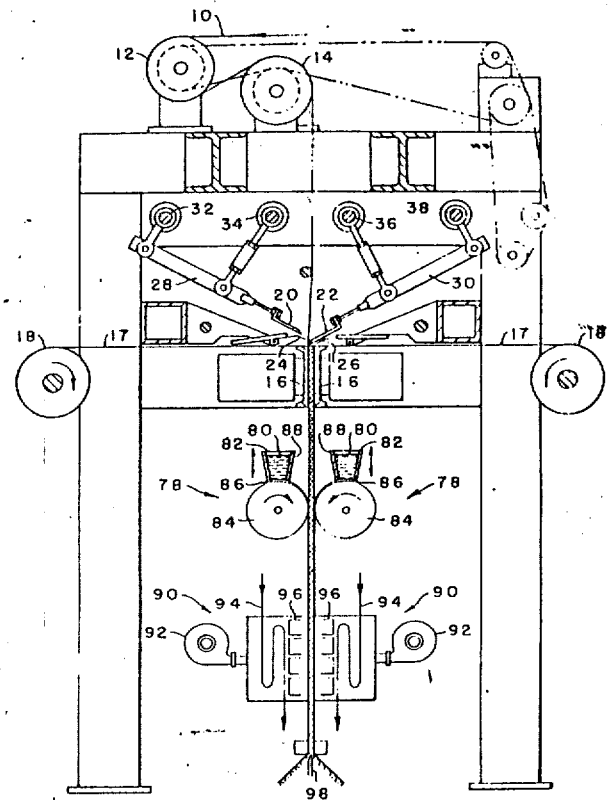

5 Claims, 11 Drawing Figures